3,300,178
TURBINES
Waheeb Rizk and Clifford Arthur Keer, both of Whetstone, England, assignors to The English Electric Company Limited, London, England, a British company
Filed Sept. 16, 1965, Ser. No. 487,761
Claims priority, application Great Britain, Sept. 24, 1964, 38,974/64
4 Claims. (Cl. 253—39.1)

This invention relates to turbines.

According to one aspect of this invention a turbine includes casing means forming a circumferentially-extending inwardly-facing annular channel, means locating the outer platforms of a row of stator blades in the mouth of said channel, an annular groove formed in the base of said channel, means to feed cooling air into said groove, and an axially-corrugated circumferential strip located against the base of said channel, with clearance from the sides thereof, so arranged that air fed into said groove is caused to flow to each axially-spaced side of the channel by said corrugated strip, to be delivered into said channel along the axially-spaced walls thereof, to cool them.

According to another aspect of this invention, a turbine includes an outer casing, a frusto-conical ring having a thin central portion and thick end rings, the end ring at the outer end being secured to the outer casing, and the end ring at the inner end of the central portion supporting and locating the outer ends of a row of stator blades, so that the stator blades are located concentrically within the outer casing when thermal expansion takes place.

One embodiment of the invention will now be described by way of example with reference to the accompanying drawings, of which:

Figure 1:
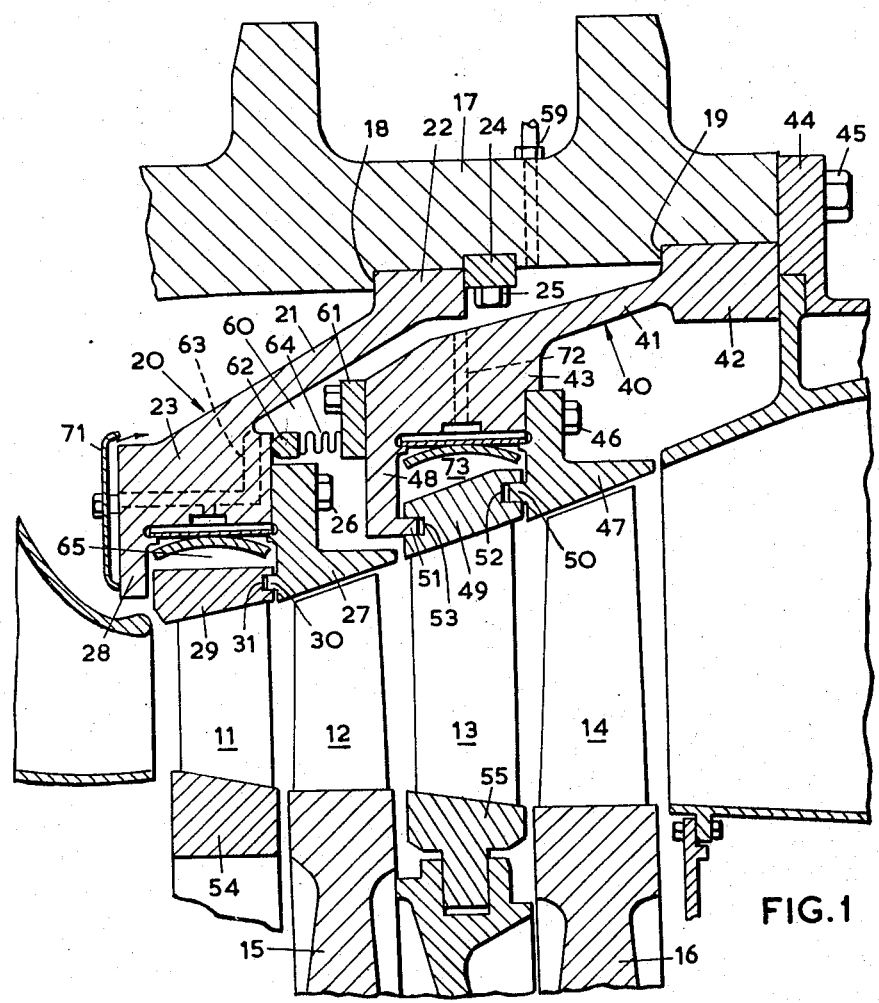
FIG. 1 shows a part of a turbine in axial section.

In the drawings there is shown a two-stage turbine, having first-stage stator blades 11, first-stage rotor blades 12, second-stage stator blades 13 and second-stage rotor blades 14. The rotor blades are mounted in discs 15, 16, which are secured to a shaft in any known or convenient manner. The construction of the rotor does not form part of the present invention, and will therefore not be further described.

The main casing 17 of the turbine is mounted coaxially with the turbine shaft, and the stator blades 11, 13 are mounted in the main casing 17 in the following manner. The inner diameter of the main casing 17 is formed with two steps 18, 19; a frusto-conical ring 20 is inserted from the downstream end of the casing so that its outer diameter fits in the intermediate inside diameter of the main casing 17, and has a plane face which abuts against the upstream step 18. The ring 20 is of frusto-conical form, having a relatively thin central portion 21 and two relatively heavy end rings 22, 23. The outer end ring 22 is secured against the step 18 by means of the segments 24 secured in grooves in the main casing 17 by setscrews 25.

Secured to the inner end ring 23 by setscrews 26 is a further ring 27, one face of which forms the outer shroud for the first-stage rotor blades 12. At the upstream end of the frusto-conical ring 20 is an inwardly-projecting flange 28, and the outer platforms 29 of the first-stage stator blades 11 are supported between the flange 28 and the ring 27. The latter is formed with an annular tongue 30 which engages annularly-extending grooves 31 in the platforms 29, of which there is one for each stator blade. When assembled, there is a gap between the platforms 29 and the flange 28, and it will be appreciated that the gas load on the stator blades 11 holds them against the ring 27, ensuring that the gap is maintained in operation.

The second-stage stator blades 13 are supported by a further frusto-conical ring 40 which also has a relatively thin central portion 41, and two relatively heavy end rings 42, 43. The end ring 42 fits within the part of the main casing 17 having the largest inside diameter, and abuts the shoulder 19 against which it is held by a flange 44 secured to the main casing by setscrews 45. Secured to the inner end ring 43 by means of setscrews 46 is a continuous ring 47 which forms the outer shroud for the second-stage rotor blades 14; at its upstream end the frusto-conical ring 40 has an inwardly-directed flange 48, and the outer platforms 49 of the stator blades 13 are mounted between the ring 47 and the flange 48. Both the ring 47 and the flange 48 are formed with annular tongues 50, 51 which engage with annularly extending grooves 52, 53 in the platforms 49.

The platforms 54, 55 at the inner ends of the stator blades may be secured to annular rings in any known or convenient way.

Cooling air is supplied through a union 59 and a bore in the main casing 17, to the space 60 between the frusto-conical rings 20, 40. To prevent the cooling air flowing directly into the working fluid passage between the ring 27 and flange 48, a seal is provided including a ring 61 secured to the upstream face of frusto-conical ring 40, and a sealing ring 62 which bears against the downstream face of the inner end ring 23 and is connected to ring 61 through the flexible annular convoluted member 64.

Figure 2:
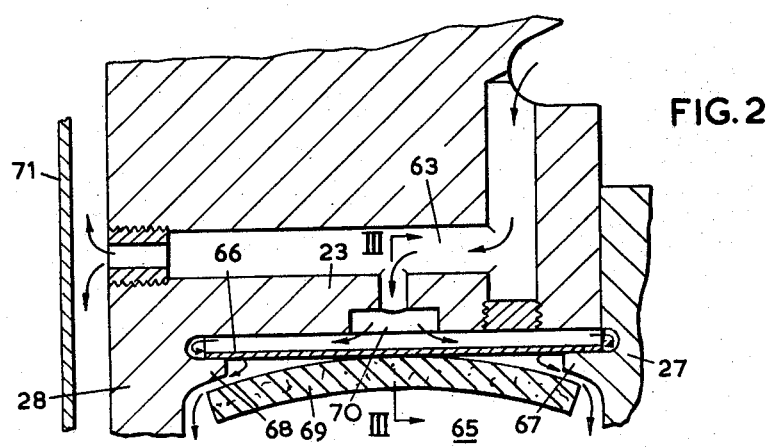
FIG. 2 is a detail view of part of FIG. 1 on an enlarged scale.
Figure 3:
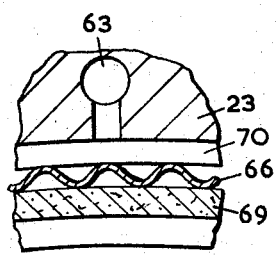
FIG. 3 is a section on the line III—III of FIG. 2.

The end ring 23 is provided, as shown in FIGS. 2 and 3, with drillings 63 between the space 60 and a space 65 defined between end ring 23, ring 27, flange 28 and platforms 29. In this space there is provided a circumferentially-extending axially-corrugated strip 66 which is held adjacent to the inner diameter of end ring 23 by means of tongues 67, 69 projecting from the upsteam side of ring 27 and from the downstream side of flange 28. Secured to the distributor strip 66 intermediate its upsteam and downsteam ends is a blanket 69 of aluminium foil lagging, the upstream and downstream edges of which lie radially inside the tongues 67, 68. Moreover, the drillings 63 open into an annular groove 70 in the end ring 23, which is approximately midway between the axially-spaced ends of the corrugated strip 66. The air is distributed circumferentially round space 65 by means of the groove 70, and emerges around the ends of the corrugations into the spaces between the tongues 67 and 68 and the downstream and the upstream edges respectively of the lagging 69, thus directing cooling air at the ring 27 and flange 28. The ends of the grooves formed by tongues 67, 68 are radiused to prevent the strip 66 moving to one end and closing the outlets at that end.

This cooling air emerges from space 65 between the flange 28 and platforms 29, and thus forms a cooling air film on the upstream and inner surfaces of the platform 29 and ring 27 which are in contact with the hot gas stream.

The upstream face of the end ring 23 may also be provided with a sheet-metal shield 71 spaced a small distance away from face, and cooling air may be fed to the intermediate space through the drillings 63. A gap may be provided, between the end of the sheet-metal shield 71 and the end ring 23, through which the air emerges to join the working fluid stream, thus cooling the end rings 23.

The end ring 43 is also provided with drillings 72 between the space 60 and a space 73 defined between end ring 43, ring 47, flange 48 and platforms 49. The drillings 72 serve the same purpose as drillings 63, and the space 73 may be provided with an annular groove in end ring 43 and a circumferentially-extending strip substantially indentical with the arrangement in space 65 and as shown in FIGS. 2 and 3. The cooling air emerges from the space 73 over the faces of the platforms 49, and also flows over the face of the ring 47 to protect it from the hot gas stream.

The construction of the frusto-conical rings 20, 40 is such that their relatively cool outer end rings 22, 42 are positively located by the main casing 17 to be concentric with the axis of rotation of the turbine, while the relatively heavy end rings 23, 43 at their inner end are free to expand radially, by virtue of the thin intermediate sections 21, 41, the relatively rigid sections 23, 43 ensuring that the circular shape is retained during expansion. In this way the stator blades 11, 13 are able to expand radially on heating, but are maintained concentric with the axis of rotation of the turbine.

Moreover, the frusto-conical rings 20, 40, form between them a plenium chamber 60 for cooling air, which not only supplies the cooling air arrangements for the stator blades as described above, but also reduces the heat input to the main casing 17 from the hot gas stream.

What we claim as our invention and desire to secure by Letters Patent is:

1. A turbine including casing means forming a circumferentially-extending inwardly-facing annular channel, means locating the outer platforms of a row of stator blades in the mouth of said channel, an annular groove formed in the base of said channel, means to feed cooling air into said groove, and an axially-corrugated circumferential strip located against the base of said channel, with clearance from the sides thereof, so arranged that air fed into said groove is caused to flow to each axially-spaced side of the channel by said corrugated strip, to be delivered into said channel along the axially-spaced walls thereof, to cool them.

2. A turbine including an outer casing, a frusto-conical ring having a thin central portion and thick end rings, the end ring at the outer end being secured to the outer casing, and the end ring at the inner end of the central portion supporting and locating the outer ends of a row of stator blades, so that the stator blades are located concentrically within the outer casing when thermal expansion takes place.

3. In a turbine having casing means; a plurality of stator blades, each stator blade having an outer platform; a rotor comprising shaft means, means rotatably to mount said shaft means co-axially within said casing means, a disc secured to said shaft means, and a plurality of rotor blades which are secured to said disc and arranged downstream of said stator blades; a source of cooling air; conduit means located within said casing means and communicating means which connect said conduit means to said source of cooling air; annular mounting means for said stator blades, said annular mounting means being mounted within said casing means;

said annular mounting means comprising a base portion and two inwardly-projecting axially-spaced flanges projecting from said base portion to form therebetween a circumferentially-extending inwardly-facing annular channel having a mouth;

said outer platforms of said stator blades being mounted in said mouth of said circumferentially-extending inwardly-facing annular channel;

said base portion being formed with an annular groove between said inwardly-projecting axially-spaced flanges;

said conduit means opening into said annular groove; and an axially-corrugated circumferential strip secured in contact with said base portion and with clearance from said inwardly-projecting axially-spaced flanges;

whereby cooling air supplied to said annular groove is directed against said base portion and against said inwardly-projecting axially-spaced flanges to cool them.

4. In a turbine, the improvement as claimed in claim 3, further comprising:

said annular mounting means comprising a frusto-conical ring having a thin central portion, a thick inner end ring and a thick outer end ring, said thick outer end ring being secured to said casing means, and said thick inner end ring comprising said base portion and said two inwardly-projecting axially-spaced flanges.

No references cited.

MARTIN P. SCHWADRON, *Primary Examiner.*

E. A. POWELL, JR., *Assistant Examiner.*